United States Patent [19]

Lemattre et al.

[11] 4,412,896

[45] Nov. 1, 1983

[54] PROCESS OF PREPARATION OF GRAFT COPOLYMER OF STYRENE AND AN EPDM RUBBER

[75] Inventors: Maurice Lemattre, Cambronne Les Ribecourt; Robert Roussel, Mazingarbe; Rene Wirth, Lens, all of France

[73] Assignee: Societe Chimique des Charbonnages, Paris, France

[21] Appl. No.: 281,533

[22] Filed: Jul. 8, 1981

[30] Foreign Application Priority Data

Jul. 10, 1980 [FR] France ................ 80 15343

[51] Int. Cl.$^3$ .......................... C08F 2/02; C08J 3/28; C08F 255/06
[52] U.S. Cl. .......................... 204/159.2; 204/159.17; 525/289; 525/290; 525/316
[58] Field of Search ................ 525/290, 316; 204/159.2, 159.17

[56] References Cited

U.S. PATENT DOCUMENTS

| | | | |
|---|---|---|---|
| 3,271,477 | 9/1966 | Kresge | 525/290 |
| 3,461,188 | 8/1969 | Baer | 525/290 |
| 3,945,976 | 3/1976 | McCurdy et al. | 525/316 |
| 3,990,479 | 11/1976 | Stine et al. | 204/159.2 |

OTHER PUBLICATIONS

Severini et al., "Graft Copolymers of EPDM Elastomers as Reinforcing Agents for Brittle Thermoplastic Materials", N. Platzer, Ed., *Copolymers, Polyblends, and Composites*, A.C.S. Advances in Chemistry Series, No. 142, pp. 201–213 (1975).

*Primary Examiner*—Wilbert J. Briggs, Sr.
*Attorney, Agent, or Firm*—Millen & White

[57] ABSTRACT

A process of preparation of a graft copolymer of (a) styrene and (b) an EPDM rubber by mass polymerization followed by irradiation, for example electron irradiation.

20 Claims, No Drawings

PROCESS OF PREPARATION OF GRAFT COPOLYMER OF STYRENE AND AN EPDM RUBBER

BACKGROUND OF THE INVENTION

The present invention relates to a process of preparation of graft copolymers of styrene and an unsaturated ethylene-propylene-diene terpolymer.

Polystyrene is a thermoplastic material, which, owing to the ease with which it can be obtained and processed, is widely used in the plastics industry. It is also well known, however, that the use of polystyrene is limited applicationwise because of its poor heat stability and weak impact resistance. To improve these properties, it has been proposed to use copolymers of styrene with other monomers, such as acrylonitrile or acrylates. It has also been proposed to use graft copolymers, obtained by polymerizing styrene on a rubbery polymer. Proposed rubbery polymers included butadiene homopolymers and copolymers. However, in view of the fact that these unsaturated rubbers are very sensitive to oxidation and to the action of light, the resultant products have substantially less than ideal physical and mechanical properties.

To improve the styrene-rubber graft copolymers, it has been proposed to substitute for the unsaturated rubbers largely saturated rubbers, for example, rubbers of ethylene and propylene (EP rubbers) and rubbers of ethylene, propylene and of a polyunsaturated monomer (EPDM rubbers). However, their use presents numerous difficulties: in particular, these slightly unsaturated rubbers, having a low content of double bonds, do not facilitate the grafting of styrene on to the elastomer. Consequently, compositions are obtained which possess a very low degree of grafting, i.e., a very low degree of polystyrene grafted on to the elastomer, at most around 2. Besides, microscopic observation shows that the resultant compositions contain large rubber globules (up to 15 microns), which are dispersed in the composition without any cohesion. Thus, the resultant composition with this type of dispersion does not have a fine microstructure, which in turn results in products lacking good optical properties.

Apart from the problems described above, which relate to stability to heat and aging, impact resistance, the degree of grafting of polystyrene as well as microstructure, it is also necessary for obtaining compositions possessing useful properties, to solve a bad problem involving the crosslinking of the elastomer. ("Elastomer" and "rubber" are used synonymously herein.) When styrene is polymerized in the presence of EPDM elastomers, crude graft products are obtained, comprising, in particular, a graft copolymer, formed by the reaction of the elastomer with the styrene monomer and elastomer groupings, made up of "bridged" groupings, i.e. rubber groupings, linked to one another by chemical bonds. The quantity of "bridged" rubber is given by the degree of crosslinking, which is expressed by the "swelling index", which is inversely proportional to the degree of crosslinking, which means that the lower the swelling index, the higher the degree of crosslinking.

To attempt to control crosslinking, several processes have been proposed involving complex reaction steps: use of a mixture of special solvents, partial oxidation of the rubber before grafting, multiple step polymerization with steps involving different polymerization techniques including mass and suspension polymerization. Unfortunately, all of these processes are unsatisfactory and, in particular, lead to graft polymers which often still possess a low degree of grafting as well as an undesired degree of crosslinking and a coarse microstructure. For reference to the patent and polymer literature regarding these processes, attention is invited to French Pat. No. 2 320 950, French Pat. No. 2 263 260 and French Pat. No. 2 164 832.

SUMMARY OF THE INVENTION

An object of this invention is to provide a process for preparing graft polymers essentially formed from polymerized styrene and a rubbery terpolymer of ethylene, propylene and a third component.

Another object is to provide a process for preparing improved graft copolymers of styrene and an EPDM rubber having a high gel content of 15–30%, especially 17–25%, a swelling index of 6–14, especially 8–12 and a microstructure such that substantially 100% of the particles have a size less than 2 microns, preferably 50% of the particles have a size less than 1.5 micron.

DETAILED DISCUSSION

According to an important feature of the invention, the obtained graft copolymers have good mechanical characteristics not only immediately after their manufacture, but also these mechanical characteristics are hardly impaired by later mechanical treatments, such as slubbing. Similarly, the degree of grafting and swelling indices are also hardly affected. ("Slubbing" or trace pressing is a process according to which, the treated substance is pressed out like a sausage and wound on a rotating disc).

According to the process of the invention the EPDM is dissolved in styrene and then the mixture is subjected to essentially a known mass polymerization step. Thereafter, the resultant polymer is subjected to a crosslinking irradiation treatment.

More specifically, an EPDM rubber (based on ethylene, propylene and a third component) and styrene are submitted to a first mass polymerization step. The third component, which enters into the composition of the rubber, used for the manufacture of the copolymers according to the invention, is preferably chosen from among hexadiene, 1,4-dicyclopentadiene, tricyclopentadiene, 5-vinyl 2-norbornene, 5-ethylidene 2-norbornene, 5-methylene 2-norbornene, 5(2-propenyl)2-norbornene, 5(5-hexenyl) 2-norbornene,4,7,8,9-tetrahydroindene and isopropylidene tetrahydro-indene. Other unconjugated diene monomers are well known from the extensive literature on EPDM rubbers, e.g. "The Stereo Rubbers", Saltman, John Wiley & Sons, N.Y., London, 1977, pp. 378-381. Preferably, rubbers are used, having an ethylene content of 19–73% by weight, a propylene content of 23–77% by weight and a content of from 4–20% by weight of the third component.

The mass polymerization step is conducted by introducing into a reactor: (a) the EPDM rubber based on ethylene, propylene and a third component, and (b) styrene, to which a minor amount of ethyl benzene may have been added.

The reactor is generally equipped with an agitator as well as heating and cooling means. When all the reactants have been introduced into the reactor, the reaction mixture is heated, with stirring so as to bring about solution of the rubber into the other reactants, e.g., at a temperature around 40° C. for about three hours.

The quantities of reactants employed can be varied. Ethyl benzene is used in amounts of 0-12% by weight of styrene. The EPDM rubber is employed in a weight ratio of styrene: rubber of between 6:1 to 20:1, preferably, between 7:1 to 13:1. After the dissolution step, the conventional additives, used in mass polymerization processes, are added: antioxidants, such as 2,6 di-tert. butyl-para-cresol, 2-2' methylene bis (4-methyl 6-tert. butylphenol), octadecyl 3-(3,5 di tert. butyl 4 hydroxyphenyl) propionate, tri-(2-methyl 4 5-hydroxy tert. butyl phenyl) butane, polymerization initiators, such as di-tert. butyl peroxide or benzoyl peroxide. All these additives are generally used in low quantities, e.g., at most 0.5% by weight related to styrene for the antioxidants; and e.g., at most 0.272% by weight for the polymerization initiators. Polymerization is generally conducted at 80°-160° C. until polymerization is essentially complete, e.g. for about 8 hours. After polymerization, the resultant polymer is generally submitted to heat treatment, then freed from volatile matter and granulated. After the mass polymerization step, the graft copolymer is submitted to irradiation treatment by means of gamma-rays, X-rays, or electron radiation. The radiation period can be varied and depends on the radiation intensity. According to the invention, electron radiation is preferably used, enabling the copolymers to be submitted to irradiation doses, which can reach 20 megarad in a very short time (several seconds), the rad being the dose unit corresponding to 100 electron-volt per gram. Preferably an apparatus is used providing a high irradiation dose in as short a period as possible.

The resultant irradiated graft copolymers possessing good mechanical properties as well as stability towards heat and aging, enables these graft copolymers to be molded into products to be used in diverse fields of application, e.g., packings, pipes, car and trailer bodies, protective covering of electronic apparatus.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

A reactor, used for mass polymerization and equipped with an agitator, a heating device and a cooling system, is filled with:

82.3 parts by weight of styrene,
8.2 parts by weight of ethyl benzene, and
9 parts by weight of an elastomer, consisting of 55% of ethylene, 36% of propylene and 9% of ethylidene norbornene and having a viscosity ML 1+8 126°=60.

The reaction mixture is stirred at 40° C. for 3 hours. 0.435 Part by weight of antioxidant, consisting of di-tert. butyl para-cresol, and 0.1 part by weight of di-tert. butyl peroxide are then added. The reaction mixture is then submitted to heating stages, so that its final temperature reaches 145° C. at the end of 7 hours and 50 minutes. After this heating phase, 81.5 parts of solid matter are obtained, which are then treated at 225° C. for 1 hour and 50 minutes. After the removal of volatile matter by submitting the polymer to heat treatment at a temperature of 200°-250° C. and at a pressure of 700-750 mm Hg, the polymer is then granulated. Table 1 summarizes the properties of the resultant non-irradiated, graft-polymerized polymers. Impact resistance is determined according to ASTM Standard D 256-73.

The Vicat Point is determined according to ASTM Standard D 1525-76; it enables the softening point to be expressed according to pressure.

The melt index, which expresses the fluidity of the product, is determined according to ASTM Standard D 1238-73.

The gel content, which expresses the degree of grafting, i.e. the quantity of polystyrene grafted on to the elastomer, is determined by shaking 1 g of the graft copolymer in 20 ml of toluene at room temperature e.g., 20°-25° C., and then centrifuging the whole to separate toluene-insoluble gel from the remainder. The percentage of gel, related to the sample taken, expresses the gel content.

The dry mass of insoluble polymer is determined by treating the previously obtained gel in vacuo.

The swelling index, which enables the degree of crosslinking to be expressed, is equal to the ratio of the mass of gel to the dry resin.

The polymer obtained has a particle size distribution such that 100% have a particle size below 2 microns. The particle size distribution is determined by the electron microscopy technique, described by KATO in J. Electro Micros 14, 1965 (20) using osmium tetroxide as detector.

TABLE 1

| Vicat Pt. (°C.) 1 kg/50° C./h | Melt index under 5 kg at 200° C. (gr/10 min) | Impact resistance kg × cm/cm | Gel content | Swelling index | Particle size distribution (micron) |
| --- | --- | --- | --- | --- | --- |
| 104 | 5.5 | 6.3 | 9 | 15.6 | 100% < 2 60% < 1.5 |

The resultant polymer is then submitted to electron radiation with the aid of an accelerator having the following characteristics.

Power: 7.4 kW, 6.2 million electron-volt; in a period of irradiation: 10 seconds one kg of polymer is submitted to a radiation of 1 megarad.

Table 2 shows the properties of the products obtained after different irradiation doses.

TABLE 2

| Irradiation dose | Vicat Point | Melt index | Impact resistance | Gel content | Swelling index | Particle size distribution (micron) |
| --- | --- | --- | --- | --- | --- | --- |
| 5 megarad | 105 | 4.9 | 6.1 | 13 | 12.8 | 100% < 2 70% < 1.5 50% < 1 |
| 10 megarad | 104 | 3.9 | 5.8 | 22.7 | 10.4 | 100% < 2 70% < 1.5 45% < 1.2 |
| 20 megarad | 104 | 3.8 | 5.5 | 24.4 | 9.7 | 100% < 2 65% < 1.5 45% < 1.2 |

It is seen from this table that the irradiated products possess a better gel content and an improved swelling index than the products described in Table 1, while retaining good impact resistance and a fine microstructure.

The non-irradiated products, —properties described in Table 1, —on the one hand, and the irradiated products, —properties described in Table 2, —on the other hand, are then submitted to a slubbing step with the aid of a machine, sold under the name of KO-KNEADER by the BUSS Company (type .PR 40). Table 3 summarizes the properties of the products after slubbing treatment.

TABLE 3

| Original product | VICAT Pt. | Melt index | Impact resistance | Gel content | Swelling index |
|---|---|---|---|---|---|
| Non-irradiated product, the properties of which are described in Table 1 | 104.5 | 7.6 | 2.1 | 3.6 | 16.9 |
| Irradiated product, the properties of which are described in Table 2 irradiated with 10 megarad | 104.5 | 5.5 | 6.1 | 20.4 | 10.8 |
| irradiated with 20 megarad | 104.5 | 5.8 | 5.4 | 22.6 | 10.0 |

Table 3 shows that only the properties of the irradiated graft copolymer are hardly impaired after slubbing step wherein the impact resistance and the gel content of the non-irradiated graft copolymer are markedly decreased.

EXAMPLE 2

Example 1 is repeated, but using different terpolymers of ethylene, propylene and diene from that employed in Example 1. Table 4 indicates the nature of the terpolymers employed and the properties of the products obtained. The quantities of the reactants employed are the same as those used in Example 1, except that test 3 is carried out without antioxidant.

As in Example 1, the products obtained are then submitted to electron irradiation with the aid of the same equipment as that described in Example 1.

Table 5 indicates the properties of the irradiated products, submitted to an irradiation of 10 megarad.

TABLE 4

| | Test No. | | |
|---|---|---|---|
| | 1 | 2 | 3 |
| Nature of terpolymer | 6.5% ethylidene norbornene 65% ethylene 28.5 propylene Mooney viscosity ML 1 + 8 126° C. = 70 | 11% ethylidene norbornene 44% ethylene 45% propylene Mooney viscosity ML 1 + 4 100° C. = 90 | 9% ethylidene norbornene 55% ethylene 36% propylene Mooney viscosity ML 1 + 8 126° C. = 50 |
| VICAT Pt. (°C.) | 104.5 | 106.5 | 105.5 |
| Melt index | 5.4 | 5.2 | 5.2 |
| Impact resistance | 7.3 | 8.7 | 8.7 |
| Gel content | 12.6 | 6.4 | 7.1 |
| Swelling index | 16.6 | 18.2 | 18.2 |
| Particle size distribution (microns) | 100% < 2 60% < 1.5 30% < 1 | 100% < 2 50% < 1.5 20% < 1 | 100% < 2 70% < 1.5 25% < 1 |

TABLE 5

| Product | Test No 1 product | Test No 2 product | Test No 3 product |
|---|---|---|---|
| VICAT Pt. (°C.) | 104.5 | 105.5 | 104.5 |
| Melt index | 4.8 | 4.9 | 4.7 |
| Impact resistance | 6.6 | 7.6 | 8.1 |
| Gel content | 15.3 | 16.3 | 17.8 |
| Swelling index | 11.8 | 9.8 | 10 |
| Particle size distribution (microns) | 100% < 2 70% < 1.5 50% < 1 | 100% < 2 65% < 1.5 45% < 1.2 | 100% < 2 70% < 1.5 45% < 1 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for preparing a crosslinked graft copolymer of styrene and an EPDM rubber, consisting essentially of mass polymerizing a solution of the EPDM rubber in styrene and recovering the resultant graft copolymer and thereafter crosslinking the resultant copolymer by irradiation treatment.

2. A process according to claim 1, wherein the solution of the EPDM rubber in styrene further comprises up to 12% by weight of ethylbenzene relative to styrene.

3. A process according to claim 1, wherein said irradiation treatment is effected with gamma rays, x-rays or electron radiation.

4. A process according to claim 3, wherein the irradiation is effected with electron irradiation.

5. A process according to claim 4, wherein the irradiation does is about 5 to 20 megarads.

6. A process according to claim 1, wherein the mass polymerization is continued until polymerization is substantially complete.

7. A process according to claim 1, wherein the polymerization step is effected with a solution having a weight ratio of styrene to the EDPM rubber of from 6:1 to 20:1.

8. A process according to claim 7, wherein said ratio is from 7:1 to 13:1.

9. A process according to claim 1, wherein after polymerization, the resultant polymer is heat treated, freed from volatile matter and granulated, and the granulated polymer is then subjected to the irradiation treatment.

10. A process according to claim 1, wherein the crosslinked graft copolymer has a gel content of 15-30%.

11. A process according to claim 10, wherein said gel content is 7-25.

12. A process according to claim 1, wherein the crosslinked graft copolymer has a swelling index of 6-14.

13. A process according to claim 12, wherein said swelling index is 8-12.

14. A process according to claim 1, wherein the microstructure of the crosslinked graft copolymer is such that substantially 100% of the particles have a size less than 2 microns.

15. A process according to claim 14, wherein at least 50% of the particles have a size less than 1.5 microns.

16. A process according to claim 6, wherein the polymerization is effected with a solution having a weight ratio of styrene to the EDPM rubber of from 6:1 to 20:1; wherein the crosslinked graft polymer has a gel content of 15-30%, and a swelling index of 6-14; and wherein the microstructure of the crosslinked graft copolymer is such that substantially 100% of the particles have a size less than 2 microns.

17. A process according to claim 16, which further comprises slubbing the crosslinked graft copolymer, the resultant slubbed copolymer having only minimally different impact resistance, gel content and swelling index from the copolymer prior to slubbing.

18. A crosslinked graft copolymer prepared by the process of claim 17.

19. A process according to claim 1, which further comprises slubbing the crosslinked graft copolymer, the resultant slubbed copolymer having only minimally different impact resistance, gel content and swelling index from the copolymer prior to slubbing.

20. A crosslinked graft copolymer prepared by the process of claim 16.

* * * * *

UNITED STATES PATENT AND TRADEMARK OFFICE
CERTIFICATE OF CORRECTION

PATENT NO. : 4,412,896

DATED : November 1, 1983

INVENTOR(S) : MAURICE LEMATTRE ET AL

It is certified that error appears in the above-identified patent and that said Letters Patent is hereby corrected as shown below:

Column 7, line 7: reads "content is 7-25."
should read -- content is 17-25.--

Signed and Sealed this

Seventh Day of February 1984

[SEAL]

Attest:

GERALD J. MOSSINGHOFF

Attesting Officer

Commissioner of Patents and Trademarks